June 8, 1948.                     D. C. HARVEY                     2,443,164
                    BLADE AND COVER BLIND SHUTTER FOR CAMERAS
                              Filed Aug. 7, 1946
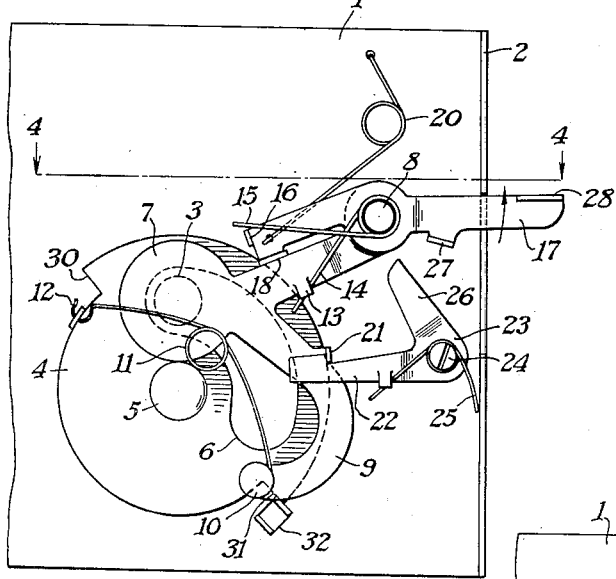
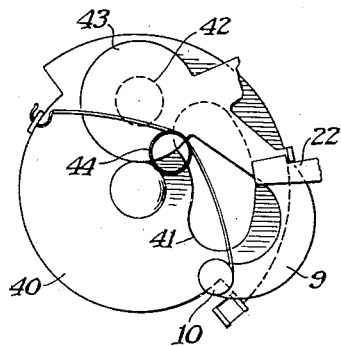
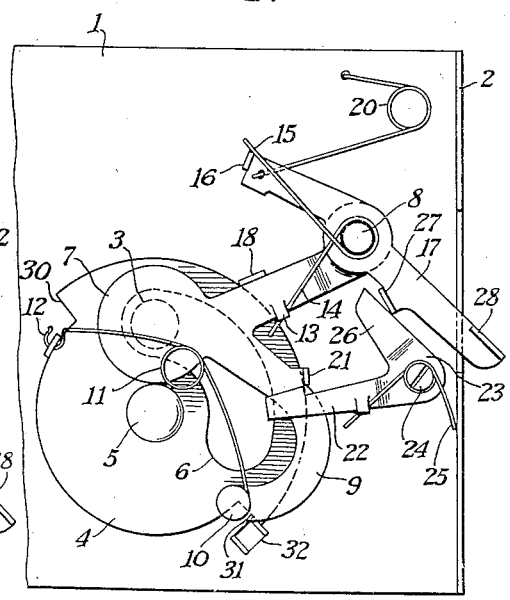
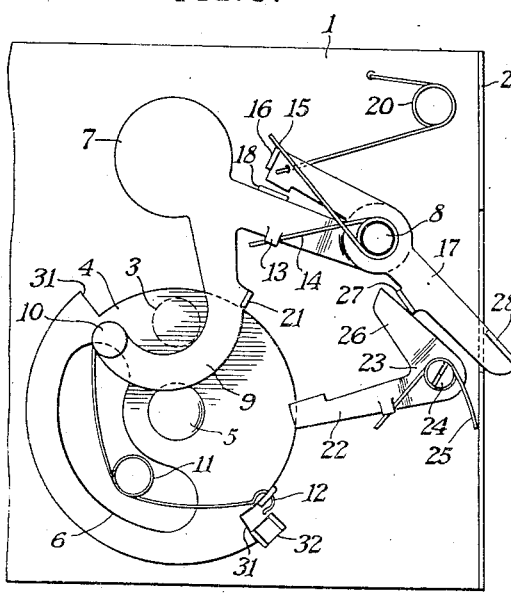
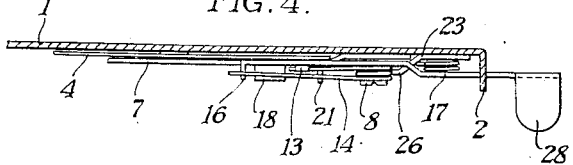
DOUGLASS C. HARVEY
INVENTOR
BY *Newton M. Perkins*
   *Ronald H. Stewart*
                ATTORNEYS Patented June 8, 1948

2,443,164

UNITED STATES PATENT OFFICE 2,443,164

BLADE AND COVER BLIND SHUTTER FOR CAMERAS

Douglass C. Harvey, Rochester, N. Y., assignor to Eastman Kodak Company, Rochester, N. Y., a corporation of New Jersey Application August 7, 1946, Serial No. 688,844

6 Claims. (Cl. 95—60)

This invention relates to photography and more particularly to shutters for inexpensive types of cameras. One object of my invention is to provide a shutter of the so-called blade and cover blind type in which the speed of operation of the shutter parts cannot be affected by the speed of operation of the shutter trigger. Another object of my invention is to provide a shutter of the class described in which means is provided for definitely preventing a shock, or blow, from accidentally causing the shutter to spring open and closed and thus spoil the film. A still further object of my invention is to provide a shutter in which the cover blind is definitely latched in its operative position when at rest, thereby excluding light from the exposure aperture. A still further object of my invention is to provide a simple and inexpensive type of shutter which is comparatively simple to assemble and which is constructed of stamped metal parts. Other objects will appear from the following specification, the novel features being particularly pointed out in the claims at the end thereof.

Blade and cover blind types of shutters have been known for many years and such shutters are perhaps the most desirable for inexpensive cameras because such shutters are usually satisfactory in operation because of their simplicity. It has been found, however, that such shutters may occasionally fail through rough handling of a camera utilizing the shutters as by allowing the camera to drop or be struck suddenly, thereby permitting some of the shutter parts to rebound. Sometimes no light is admitted when the shutter parts move, or vibrate slightly, but at other times it is possible to fog or otherwise spoil a film in the camera. In my improved blade and cover blind construction, the accidental operation of any of the shutter parts in the manner described is definitely prevented.

In such inexpensive camera shutters it frequently happens that it is difficult to obtain a relatively slow exposure of say, 1/25 to 1/30 of a second, without providing some means for slowing up the operation of the shutter parts. Since it is usually necessary to employ an extremely weak spring, the use of a stronger spring increases this difficulty. It is a very simple matter to obtain a comparatively fast exposure, such as say, 1/80 to 1/100 of a second, because a shutter blade can be made to swing quickly with comparative ease. I have found a convenient way of producing an exposure of almost any duration between 1/30 and 1/100 of a second, by merely altering the slot in the shutter blade and if a slow exposure is required, by utilizing the cover blind to start the exposure which will then be continued and terminated by the shutter blade. The shutter can be built with the required characteristics, but it is not adapted to produce different speeds of exposure after once having been built. However, the fact that the required speed can readily be obtained in the factory is an important feature.

Coming now to the drawings wherein like reference characters denote like parts throughout:

Fig. 1 is a rear elevation of a shutter constructed in accordance with and embodying a preferred form of my invention, the shutter parts being shown in their normal position of rest;

Fig. 2 is a fragmentary view, similar to Fig. 1, but with the parts in the position they assume just before an exposure is made;

Fig. 3 is a view similar to Fig. 1 but with the parts in the position they assume after an exposure has been made;

Fig. 4 is a fragmentary section taken on line 4—4 of Fig. 1; and

Fig. 5 is a fragmentary detail of a shutter constructed in accordance with a second embodiment of my invention.

In the drawings I have illustrated my invention in two embodiments, and in each of these, the shutter is shown as being of the blade and cover blind type, being known as an automatic shutter in that it does not include a separate setting member.

My shutter consists broadly in a shutter blade and cover blind, and if a slow exposure is to be required, such as 1/30 of a second, I prefer to use the cover blind to start the exposure and the shutter blade to continue and terminate the exposure. If, on the other hand, a faster exposure is required, I prefer to both start and conclude the exposure with the shutter blade alone. The cover blind is definitely latched in a position to prevent accidental operation, and, as will be now fully pointed out, the construction is simple and consists of but few parts.

The support 1 may consist of a metal plate having flanges 2 for mounting it in a camera, and including an exposure aperture 3 through which light passes in making an exposure. It is obvious that the support may be made in any shape or form desired. A shutter blade 4 is pivoted on a stud 5 adjacent the exposure aperture and the shutter blade includes an arcuate slot 6 which swings past the exposure aperture 3 in making an exposure. Since the shutter now being described is intended to make an exposure of 1/30 of a second, the slot 6 is, as shown, of sufficient length to lie over the exposure aperture when the shutter blade 4 is in its rest position shown in Fig. 1. In this position the exposure aperture 3 is covered by the end 7 of a cover blind; this cover blind being pivoted on a stud 8 and including an offset arm 9 carrying a stud 10 which supports one end of a hairpin spring 11 attached at 12 to the shutter blade 4. The cover blind 7 includes a struck-up lug 13, beneath which one end 14 of a spring encircling the stud 8 is passed; the opposite end 15 of this spring engaging a lug 16 on a trigger member 17 which, in this instance, is pivoted also upon the stud 8. The cover blind includes a flange 18 lying in the path of the trigger member 17 so that when a spring 20 moves the trigger member 17 in the direction shown by the arrow in Fig. 1, the cover blind will also be moved.

The arm 9 carries an upstanding lug 21 which is engaged by a spring latch member 22 when the parts are in the position of rest in Fig. 1; this latch member being in the form of a bell crank lever 23 pivoted at 24 to the support. A spring 25 encircles the pivot 24 and normally holds the spring latch in the position shown. The arm 26 of the bell crank lever lies in the path of a lug 27 on the trigger so that it may be released when this lug engages the arm, as partially indicated in Fig. 2, where the releasing operation has been started but not yet completed. I prefer to provide a finger piece 28 on the trigger.

The operation of the shutter is as follows: In order to make an exposure, the finger piece 28 is depressed and the trigger is moved from its Fig. 1 to its Fig. 2 position. This accomplishes several purposes. First, it tensions the spring encircling the pivot 8 and gradually increases this spring tension up to the Fig. 2 position in which the lug 27 strikes the bell crank lever 26 and moves the latch 22 away from the cover blind lug 21. When the latch is released, the cover blind moves quickly from its Fig. 2 position to its Fig. 3 position. This causes the cover blind 7 to clear the exposure aperture 3 quite rapidly as it tensions and releases the hairpin spring 11 by which it is connected to the shutter blade 4. After the aperture 3 has been opened by the cover blind 7, the hairpin spring 11, having been tensioned and brought past dead center, causes the shutter blade 4 to swing so that the slot 6 continues and terminates the exposure started by the cover blind. The shutter blade finally reaches the Fig. 3 position. When in this position, the finger piece 28 is either suddenly or gradually released and the spring 20 will cause the trigger and cover blind to move together from the Fig. 3 to the Fig. 1 position in which the cover blind lug 21 will snap beneath the latch member 22, thereby holding the parts in their initial position of rest, as indicated in Fig. 1. Since the cover blind 7 is returned to its initial position, the hairpin spring 11 is again tensioned and released, and after the cover blind 7 has covered the exposure aperture 3, the shutter returns to its initial position.

In the present embodiment I prefer to provide a pair of spaced shoulders 30 and 31 on the shutter blade 4 so that they may contact with a stop member 32 at each end of their movement. With a shutter constructed as above described, there is no danger of rebound at the termination of an exposure because the slot 6 moves well beyond the exposure aperture 3, as indicated in Fig. 3. When the parts return to their initial position of rest, there can be no accidental exposure because the cover blind 7 completely covers the exposure aperture 3 and is definitely latched in this position. Therefore, even if the shutter blade 4 should rebound, it would make no difference because the cover blind is latched in a light-excluding position.

If it should be desired to produce a shutter with a fast exposure as, for instance, $1/80$ of a second, the shutter blade may be modified, as shown in Fig. 5. In this form of my invention the shutter blade 40 is provided with a slot 41 which is considerably shorter than the slot 6 of the shutter blade 4. This slot does not lie over the exposure aperture 42 when the parts are in their position of rest, as shown in Fig. 5, so that when the cover blade 43 is moved away from the exposure aperture 42, the exposure does not start. The exposure is started by the hairpin spring 44 being tensioned and released when the slot 41 starts to uncover the aperture 42, so that the slot 41 both starts and terminates the exposure. It is a simple matter to provide quite a variety of exposures in an initial set-up by changing the strength of the shutter spring 44.

With my improved form of shutter, it is only necessary to determine how long an exposure is desired before making the shutter blade in order to provide a slot 41 of the proper length for the required exposure. As mentioned above, the slow-speed exposures, such as $1/25$ or $1/30$ of a second, are the most difficult to obtain using relatively-strong and positively-acting springs. For these slow speeds it is a simple matter to start the exposure through the opening of the cover blind which can be made to occur very quickly with the construction as above described.

I claim:

1. A photographic shutter of the type including a support, an exposure aperture therein, a shutter blade and a cover blind, each separately mounted on offset pivots upon the support, the combination with said pivoted cover blind, of a latch normally holding the cover blind against movement, a compression spring the ends of which connect the cover blind and shutter blade and adapted to be compressed and released through movement of the cover blind about its offset pivot with respect to the shutter blade, an exposure slot in the shutter blade adapted to pass light through the exposure aperture, a pivotally-mounted trigger, an extension spring connecting the trigger and cover blind, and means carried by the trigger for releasing the latch after a predetermined tensioning of the extension spring connecting the trigger and cover blind whereby said cover blind may operate the shutter blade through the compression spring connecting the shutter blade and cover blind.

2. A photographic shutter of the type including a support, an exposure aperture therein, a shutter blade and a cover blind, each separately mounted on offset pivots upon the support, the combination with said pivoted cover blind, of a latch normally holding the cover blind against movement, a compression spring the ends of which connect the cover blind and shutter blade and adapted to be compressed and released through movement of the cover blind about its offset pivot with respect to the shutter blade, an exposure slot in the shutter blade adapted to pass light through the exposure aperture, a pivotally-mounted trigger, an extension spring connecting the trigger and cover blind, and means carried by the trigger for releasing the latch after a predetermined tensioning of the extension spring connecting the trigger and cover blind whereby said cover blind may operate the shutter blade through the compression spring connecting the shutter blade and cover blind, the trigger extension spring being of sufficient strength to overcome the shutter blade compression spring and returning both the trigger and the cover blind to a position of rest in which the latch is again operative to retain the cover blind against movement.

3. A shutter as defined in claim 1 characterized by the shutter blade slot lying at least partially over the exposure aperture when the shutter parts are in a position of rest.

4. A shutter as defined in claim 1 characterized by the shutter blade slot lying at least partially over the exposure aperture when the shutter parts are in a position of rest, and further characterized by the movement of the cover blind, when the latch is released, starting the exposure which is continued and concluded by the shutter blade.

5. A photographic camera including, in combination, a support having an exposure aperture therein, a shutter blade pivotally mounted adjacent the aperture and having a slot normally lying partially over the exposure aperture in a normal position of rest, a cover blind mounted to turn on a pivotal mount offset from the pivotally mounted shutter blade and lying over the aperture in a normal position of rest, a compression spring the ends of which are connected to the cover blind and shutter blade, said compression spring being adapted to be tensioned and released through movement of the cover blind about its offset pivot with respect to the shutter blade, a spring latch for holding the cover blind in a normal position of rest, a trigger pivotally mounted on the support and having a path of movement terminating in a latch-releasing position, means for operating the cover blind rapidly when the latch is released, and means included in the trigger for returning the cover blind to its latch position after an exposure has been made.

6. A photographic camera including, in combination, a support having an exposure aperture therein, a shutter blade pivotally mounted adjacent the aperture and having a slot normally lying partially over the exposure aperture in a normal position of rest, a cover blind pivotally mounted and offset from the pivotal mount of the shutter blade and lying over the aperture in a normal position of rest, a compression spring the ends of which connect the cover blind and shutter blade, said compression spring being compressed and released through movement of the cover blind about its pivot offset from the shutter blade pivot, a spring latch for holding the cover blind in a normal position of rest, a trigger pivotally mounted on the support and having a path of movement terminating in a latch-releasing position, means for operating the cover blind rapidly when the latch is released, a trigger spring for moving the trigger into contact with the cover blind and for moving both the trigger and the cover blind to an initial position or rest.

DOUGLASS C. HARVEY.